(12) United States Patent
Schiwiora et al.

(10) Patent No.: US 11,731,474 B2
(45) Date of Patent: Aug. 22, 2023

(54) LEAF SPRING BEARING AND MOTOR VEHICLE WHEEL SUSPENSION HAVING SAME

(71) Applicant: VOLKSWAGEN AKTIENGESELLSCHAFT, Wolfsburg (DE)

(72) Inventors: Nils Schiwiora, Braunschweig (DE); Ingo Winter, Isenbüttel (DE)

(73) Assignee: Volkswagen Aktiengesellschaft

( * ) Notice: Subject to any disclaimer, the term of this patent is extended or adjusted under 35 U.S.C. 154(b) by 108 days.

(21) Appl. No.: 17/438,609

(22) PCT Filed: Jan. 16, 2020

(86) PCT No.: PCT/EP2020/051073
§ 371 (c)(1),
(2) Date: Sep. 13, 2021

(87) PCT Pub. No.: WO2020/182356
PCT Pub. Date: Sep. 17, 2020

(65) Prior Publication Data
US 2022/0134825 A1    May 5, 2022

(30) Foreign Application Priority Data

Mar. 12, 2019 (DE) ............. 10 2019 203 366.0

(51) Int. Cl.
*B60G 11/08* (2006.01)
*B60G 11/113* (2006.01)
*B62D 65/12* (2006.01)

(52) U.S. Cl.
CPC ............ *B60G 11/113* (2013.01); *B60G 11/08* (2013.01); *B60G 2202/114* (2013.01); *B60G 2204/121* (2013.01); *B62D 65/12* (2013.01)

(58) Field of Classification Search
CPC . B60G 11/113; B60G 11/08; B60G 2202/114; B60G 2204/121; B62D 65/12
See application file for complete search history.

(56) References Cited

U.S. PATENT DOCUMENTS 5,676,356 A * 10/1997 Ekonen .................. F16F 1/40
267/141.1
6,029,987 A    2/2000 Hoffman et al.
(Continued)

FOREIGN PATENT DOCUMENTS

CN    204020468 U    12/2014
DE    19721878 A1    12/1998
(Continued)

OTHER PUBLICATIONS

Search Report for International Patent Application No. PCT/EP2020/051073; dated Mar. 26, 2020.

*Primary Examiner* — Toan C To
(74) *Attorney, Agent, or Firm* — Barnes & Thornburg, LLP

(57) ABSTRACT

A leaf spring bearing for supporting a leaf spring against a transportation vehicle body having a body-side coupling portion and at least one elastomer portion for compensating displacements transverse to the supporting direction. A centering apparatus for interlockingly engaging with a vehicle-body-side counter-contour is provided on the coupling portion. The centering apparatus on the coupling portion guides the coupling portion of the leaf spring bearing in the event of deviations from a target contact position on the transportation vehicle body transverse to the supporting direction, toward the target contact position. Also disclosed is a transportation vehicle wheel suspension having the disclosed leaf spring bearing and an assembly method.

15 Claims, 3 Drawing Sheets

(56) References Cited

U.S. PATENT DOCUMENTS

| | | | |
|---|---|---|---|
| 6,206,407 B1* | 3/2001 | Fuchs | B60G 11/42 |
| | | | 280/686 |
| 7,651,107 B1* | 1/2010 | Chapin | B60G 11/42 |
| | | | 280/681 |
| 8,360,454 B2 | 1/2013 | Fruhmann et al. | |
| 8,444,163 B2* | 5/2013 | Fruhmann | F16F 1/3683 |
| | | | 267/7 |
| 8,454,042 B2 | 6/2013 | Hochapfel et al. | |
| 8,459,676 B2* | 6/2013 | Heimann | B60G 21/026 |
| | | | 267/7 |
| 8,814,191 B2* | 8/2014 | Lindtner | B60G 21/05 |
| | | | 280/124.164 |
| 9,849,744 B2 | 12/2017 | Girelli Consolaro et al. | |
| 10,124,641 B2 | 11/2018 | Boeke et al. | |
| 10,767,719 B2* | 9/2020 | Jang | B60G 11/02 |
| 10,889,154 B2 | 1/2021 | Winter | |
| 10,994,581 B2* | 5/2021 | Keeler | B60G 11/04 |
| 2003/0164586 A1* | 9/2003 | Michael | F16F 1/377 |
| | | | 267/140.11 |
| 2006/0180048 A1* | 8/2006 | Teichman | F16F 9/052 |
| | | | 105/198.1 |
| 2014/0327196 A1* | 11/2014 | Hummelt | B60G 11/08 |
| | | | 267/52 |
| 2020/0331314 A1* | 10/2020 | Plantan | B60G 17/005 |

FOREIGN PATENT DOCUMENTS

| | | |
|---|---|---|
| DE | 19814792 A1 | 10/1999 |
| DE | 102008053886 A1 | 5/2009 |
| DE | 102009028896 A1 | 3/2011 |
| DE | 102010060093 A1 | 4/2012 |
| DE | 102013217113 B3 | 3/2015 |
| DE | 102014223576 A1 | 5/2016 |
| DE | 102015121189 A1 | 6/2017 |
| DE | 102016220325 A1 | 4/2018 |
| DE | 102018206023 A1 | 12/2018 |
| EP | 1155884 A2 | 11/2001 |
| FR | 2521939 A1 | 8/1983 |
| JP | H058625 A | 1/1993 |
| JP | 2012171601 A | 9/2012 |

* cited by examiner

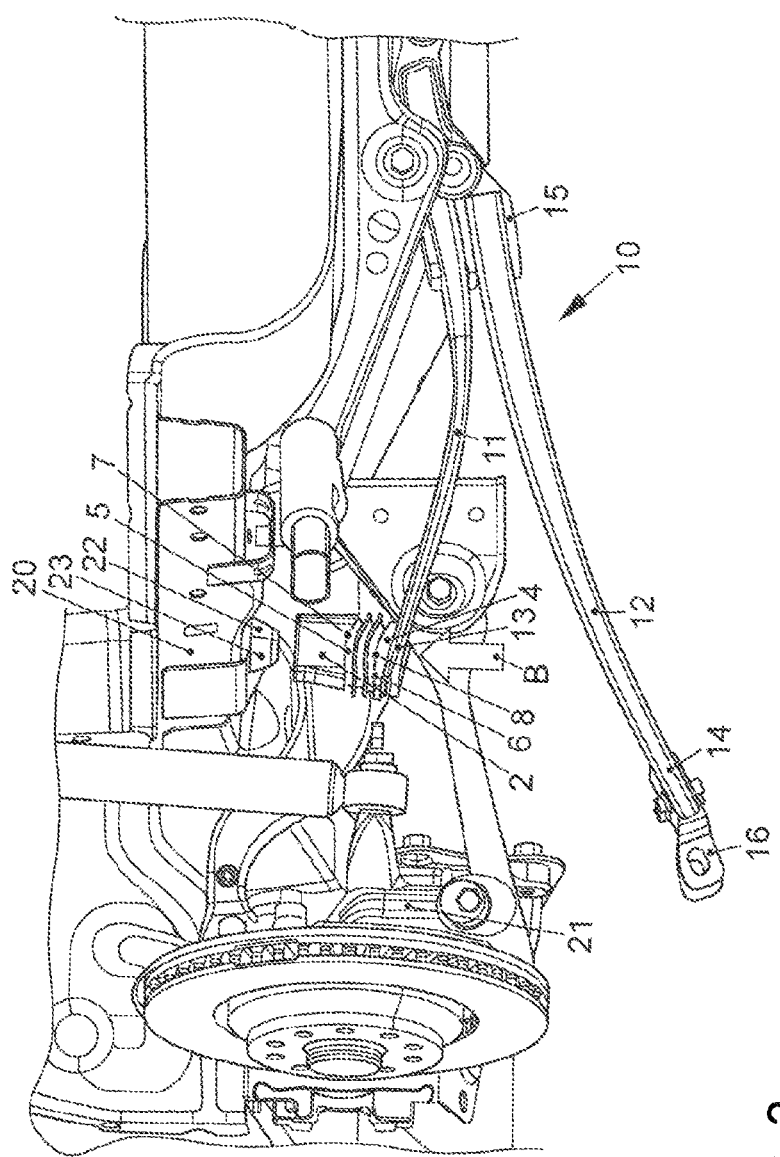

LEAF SPRING BEARING AND MOTOR VEHICLE WHEEL SUSPENSION HAVING SAME

PRIORITY CLAIM

This patent application is a U.S. National Phase of International Patent Application No. PCT/EP2020/051073, filed 16 Jan. 2020, which claims priority to German Patent Application No. 10 2019 203 366.0, filed 12 Mar. 2019, the disclosures of which are incorporated herein by reference in their entireties.

SUMMARY

Illustrative embodiments relate to a leaf spring mount for the support of a leaf spring against a transportation vehicle body, comprising a body-side coupling section, and at least one elastomer section for the compensation of movements transversely with respect to the supporting direction, a centering device being provided on the coupling section for the positively locking engagement with a transportation vehicle body-side mating contour. Furthermore, illustrative embodiments relate to a transportation vehicle wheel suspension system with a leaf spring mount of this type.

BRIEF DESCRIPTION OF THE DRAWINGS

Disclosed embodiments will be explained in greater detail with respect to the drawing, in which:

FIG. 1 shows an exemplary embodiment of a leaf spring mount in the installed position on a leaf spring;

FIG. 2 shows an exemplary embodiment of a transportation vehicle wheel suspension system during vehicle assembly in which the leaf spring mount and the associated leaf spring approach their installation location on the transportation vehicle body;

DETAILED DESCRIPTION

Figure 3:
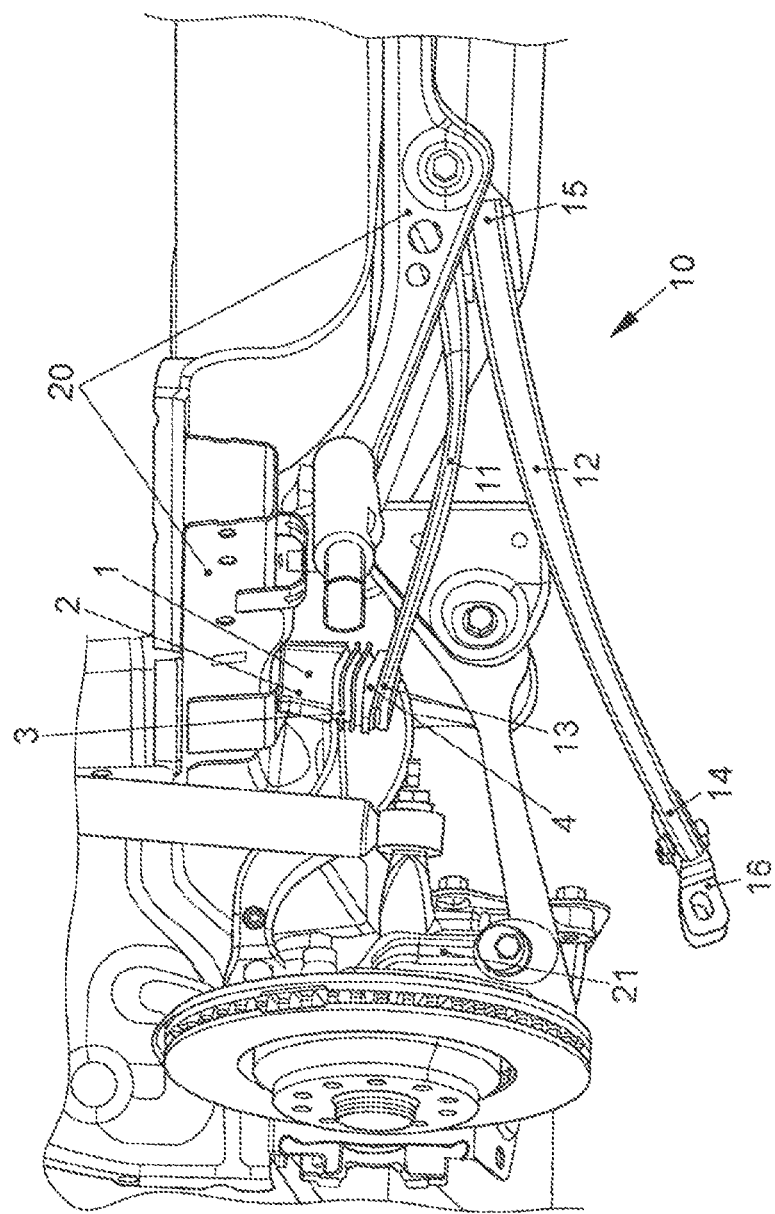
FIG. 3 shows the transportation vehicle wheel suspension system of FIG. 2 during mounting when the setpoint bearing position of the leaf spring mount on the transportation vehicle body has been reached, the leaf spring still being relieved.

A leaf spring mount of the generic type and a transportation vehicle wheel suspension system of the generic type with a leaf spring mount of this kind are known from DE 10 2016 220 325 A1.

As is explained in DE 10 2016 220 325 A1, it is fundamentally possible for a free end section of the leaf spring to be fastened directly to the transportation vehicle body. In the simplest case, a corresponding fastening device consists merely of one or more clamping bolts or the like. Furthermore, DE 10 2016 220 325 A1 discusses an articulated coupling to introduce an additional degree of freedom at the body-side attachment point.

A length compensation between the attachment points of the leaf spring has to be ensured for each compression state in the case of compression and rebound of a leaf spring in a transportation vehicle wheel suspension system. To avoid constraints, it is proposed in DE 10 2016 220 325 A1 for small relative movements between the leaf spring and the transportation vehicle body to be compensated for via the leaf spring mount.

In this regard, DE 10 2016 220 325 A1 discloses a leaf spring mount which has a supporting body which is configured to be rigid in compression and tension and is supported via a first rubber buffer on the transportation vehicle body and via a second rubber buffer on an end section of the leaf spring. Journals can be configured at the axial ends of the supporting body, which journals penetrate the respective rubber buffer and serve for the positional fixing of the leaf spring mount on the leaf spring and on the transportation vehicle body, where corresponding openings are provided. The rubber buffers avoid constraints during deforming and pivoting of the leaf spring 12, with the result that the deformation potential of the leaf spring can be utilized satisfactorily.

In mass production, there is an interest for a transportation vehicle axle to be mounted on the transportation vehicle body as far as possible in an automated manner overall. Here, the leaf spring mount is one of the interfaces with the transportation vehicle body.

The leaf spring mount which is known from DE 10 2016 220 325 A1 cannot be positioned on the transportation vehicle body with a reliable process on account of the journals, since dimensional deviations foil automated mounting. Rather, the known leaf spring mount has to be pressed manually into the correct position to achieve the desired screwing position.

The disclosed embodiments remedy this. The disclosed embodiments facilitate the mounting of a transportation vehicle wheel suspension system, which has a leaf spring, on the transportation vehicle body.

This is achieved by way of a leaf spring mount as claimed in patent claim 1. The disclosed leaf spring mount comprises a body-side coupling section, and at least one elastomer section for the compensation of movements transversely with respect to the supporting direction, a centering device being provided on the coupling section for the positively locking engagement with a vehicle body-side mating contour. It is distinguished by the fact that the centering device is configured on the coupling section so as to guide the coupling section of the leaf spring mount, in the case of deviations from a setpoint bearing position on the transportation vehicle body, transversely with respect to the supporting direction in the direction toward the setpoint bearing position.

This ensures that, in the case of mounting of a transportation vehicle wheel suspension system which has a leaf spring on the transportation vehicle body, the leaf spring mount practically automatically reaches the desired setpoint bearing position on the transportation vehicle body in the case of dimensional deviations, as a result of which high process reliability in relation to the positioning of the leaf spring mount on the transportation vehicle body is achieved. Any dimensional deviations transversely with respect to the supporting direction are compensated for during the assembly by way of the centering device, by a corresponding positional correction transversely with respect to the supporting direction being brought about by way of the centering device during the course of the approach of the leaf spring mount to the setpoint bearing position, until ultimately the correct setpoint bearing position is reached at the end of the approach. As a result, automated mounting can take place in mass production without additional manual interventions.

Moreover, in the setpoint bearing position, the centering device ensures positional fixing of the leaf spring mount on the transportation vehicle body transversely with respect to the supporting direction, on account of the positively locking engagement. If, in its installed position, the leaf spring mount is loaded at all times by way of a pressure force in the supporting direction, additional fastening methods or mechanisms, such as screws or the like, for fixing the leaf spring mount on the transportation vehicle body can be dispensed with. Rather, the leaf spring mount can be positioned and fixed solely on account of the positively locking engagement and on account of the pressure force. This makes a simpler construction of the leaf spring mount possible, and affords further mounting benefits, in particular in the case of automated mounting, since an additional fastening process can be dispensed with.

Thus, for example, the centering device can be configured on the coupling section as a recess, and can be produced very simply as a result.

With regard to simple production and a compact overall design of the leaf spring mount, furthermore, it is possible for the coupling section to be vulcanized onto the elastomer section.

In accordance with a further beneficial refinement, the coupling section can consist of a material which has a higher rigidity than the material of the elastomer body. This firstly ensures positionally accurate positional fixing, and secondly a low rigidity of the mount can be achieved, in particular in the direction transversely with respect to the supporting direction, with regard to the compensation of constraints. In addition, the leaf spring mount remains comparatively rigid in the supporting direction, with the result that the spring rate of the leaf spring in the supporting direction is not impaired.

The centering device can comprise a mandrel and a corresponding recess, it being possible for the arrangement to take place selectively on the vehicle body and on the leaf spring mount. If a mandrel is provided on the body side, such as, for example, for the purpose of the support of a conventional coil spring, the leaf spring mount is configured with a corresponding recess.

It is possible for the mandrel of a coil spring support to also be used for the support of a leaf spring mount, with the result that different axles with identical body-side structures are compatible in relation to the springs which are used.

To make it easier for the setpoint bearing position to be reached, the mandrel and the corresponding recess can be, for example, of conical configuration.

In accordance with a further beneficial refinement, the coupling section and the elastomer section have a common contact face.

In accordance with a further beneficial refinement, the leaf spring mount has a further coupling section for fastening the leaf spring mount to a leaf spring. Here, the elastomer section connects to the two coupling sections, namely connects the body-side coupling section and the leaf spring-side coupling section to one another, as a result of which an interface to the leaf spring is obtained, which interface is favorable in terms of production and handling. The two coupling sections may be otherwise non-connected. Furthermore, there is the possibility for the elastomer section to be vulcanized directly onto an end section of a leaf spring.

To achieve the abovementioned, a transportation vehicle wheel suspension system as claimed in patent claim 8 is proposed. The transportation vehicle wheel suspension system comprises a leaf spring made from fiber reinforced plastic, and a leaf spring mount which is arranged on an end section of the leaf spring to support the leaf spring against a transportation vehicle body, a positively locking centering device being provided between the leaf spring mount and the transportation vehicle body, the leaf spring mount bearing loosely against the transportation vehicle body, and the leaf spring being prestressed so as to hold the leaf spring mount pressed against the transportation vehicle body at all times over the entire compression and rebound travel of the transportation vehicle wheel suspension system and to fix it as a result. This achieves the mounting benefits which have already been explained above, since a separate fastening operation for fixing the leaf spring mount on the transportation vehicle body becomes obsolete. To this end, the leaf spring can be configured in the above-described way.

In accordance with at least one disclosed embodiment, the transportation vehicle wheel suspension system comprises a further leaf spring made from fiber reinforced plastic which forms a V-shaped structure together with the first leaf spring, the V-shaped structure being supported on the transportation vehicle body side in the region of the joined ends of the two leaf springs, and the further leaf spring being supported on the wheel side on its free end section. The bracing of the entire V-shaped structure takes place in the installed position by way of the further leaf spring. It is possible as a result to provide a suspension method or mechanism of a transportation vehicle wheel on each wheel side, which suspension method or mechanism is possibly even independent of the other wheel side.

Furthermore, a method for the mounting of a transportation vehicle wheel suspension system is proposed, in the case of which method a leaf spring which is provided with a leaf spring mount is mounted from below on the transportation vehicle body, by the leaf spring being connected, in the relieved state, by way of its end section which lies opposite the leaf spring mount, and the leaf spring mount being moved into contact against the transportation vehicle body, the centering device guiding the leaf spring mount, during mounting, into the setpoint bearing position on the transportation vehicle body, and the leaf spring being subsequently stressed, as a result of which the leaf spring mount is held in the setpoint bearing position solely by way of the centering action and the supporting force. The method can be automated with a reliable process for mass production.

Figure 4:
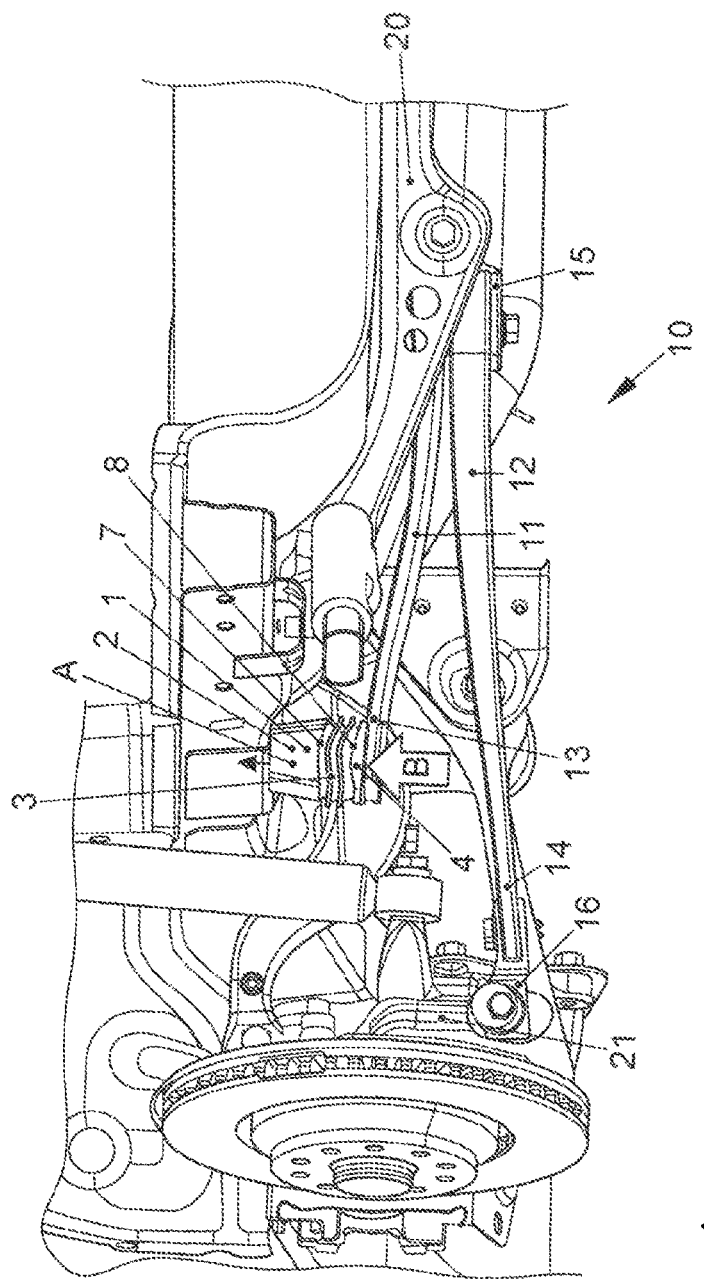
FIG. 4 shows the transportation vehicle wheel suspension system of FIG. 2 after mounting of the leaf spring and prestressing thereof has ended in the case of a transportation vehicle standing on the underlying surface.

FIG. 1 shows, by way of example, a leaf spring mount 1 for the support of a leaf spring 11 against a transportation vehicle body 20 which is shown in FIGS. 2 to 4 and in the present case is also understood to mean components which are fixed on the body such as, for example, subframes and the like.

Mounting of a transportation vehicle wheel suspension system 10 which is likewise shown in FIGS. 2 to 4 is achieved on the transportation vehicle body 20 by way of the leaf spring mount 1.

In the case of the exemplary embodiment which is shown, the leaf spring 11 is part of a spring device which consists of two leaf springs 11 and 12 per wheel side. The leaf spring mount 1 which is described within the context of the exemplary embodiment can also be used, however, in other spring devices of a transportation vehicle wheel suspension system, for example, in those which have merely a single leaf spring 11 per wheel side.

The leaf springs 11 and 12 of the exemplary embodiment may be produced from a fiber reinforced plastic, in particular, glass fiber reinforced plastic (GFRP) or carbon fiber reinforced plastic (CFRP). They can be of a rod-shaped or bar-shaped configuration. In the case of the exemplary embodiment which is shown in FIG. 1, the two leaf springs 11 and 12 are configured as separate components. It is also possible for the two leaf springs 11 and 12 to be integrated into a single-piece body which is manufactured from fiber reinforced plastic.

In the present case, the two leaf springs 11 and 12 form a V-shaped structure together in a vertical plane, it being possible for the leaf springs 11 and 12 to have a length which is different than one another, and the leaf springs 11 and 12 being installed in the transportation vehicle so as to lie above one another. For the formation of the V-shaped structure, in each case one end section of the first leaf spring 11 and one end section of the further leaf spring 12 are joined and are connected to one another, as a result of which the tip of the V-shape is obtained. The V-shaped spring device which is formed in this way may be supported pivotably on the transportation vehicle body 20 via the tip. The end sections, which lie in each case opposite one another, of the leaf springs 11 and 12 correspondingly form free end sections of the V-shape, the first leaf spring 11 being supported on the transportation vehicle body side by way of its free end section 13, and the further leaf spring 12 being supported on the wheel side on its free end section 14. On account of the shorter length of the first leaf spring 11, its transportation vehicle body-side supporting point on the free end section 13 of the first leaf spring 11, in the case of an arrangement of the spring device in the transportation vehicle transverse direction, lies closer to the transportation vehicle center than the wheel-side supporting point of the further leaf spring 12.

The V-shape can be configured in such a way that the main direction of extent of the first leaf spring 11 and the main direction of extent of the second leaf spring 12 enclose an acute angle α in a relieved state of the spring device according to FIG. 2. The acute angle α may lie in the range from 15° to 35°, with the result that firstly a small installation height can be ensured, and secondly a sufficient compression potential for energy absorption is available. In contrast, FIG. 4 shows the spring device in a prestressed state in the case of a transportation vehicle standing on the underlying surface. This corresponds to the installed position in the transportation vehicle.

A suitable mount device is provided in each case at the abovementioned supporting points of the spring device.

In the case of the exemplary embodiment which is shown, a first mount device 15 is provided for the articulated attachment of the tip of the V-shaped spring device to the transportation vehicle body 20. The first mount device 15 can be configured for the mutual bracing of the joined end sections of the first and further leaf spring 11 and 12. By using the clamping action, a rotational movement of the further leaf spring 12 which results from compression and a deformation thereof can be transmitted to the first leaf spring 11, and vice versa. The clamping action can be configured as described in DE 10 2016 220 325 A1.

A second mount device 16 for the articulated attachment of the wheel-side free end section of the further leaf spring 12 to a wheel support 21 can be configured, for example, as a fork. The attachment at this location can also take place as described in DE 10 2016 220 325 A1.

The body-side attachment of the free end section 13 of the first leaf spring 11 is carried out via the abovementioned leaf spring mount 1 which is now to be explained in greater detail in the following text.

The leaf spring mount 1 comprises a body-side coupling section 2 for support against the transportation vehicle body 20, and at least one elastomer section 3 for the compensation of movements transversely with respect to the supporting direction A. Furthermore, the leaf spring mount 1 can have a leaf spring-side coupling section 4 for support against the first leaf spring 11.

The at least one elastomer section 3 is arranged between the two coupling sections 2 and 4 and connects the latter to one another. The two coupling sections 2 and 4 are otherwise non-connected.

The elastomer section 3 can be vulcanized onto the coupling sections 2 and 4, with the result that no additional fastening method or mechanism which might impair the compact dimensions of the leaf spring mount 1 are required for this purpose.

In a modification of the exemplary embodiment which is shown, the leaf spring-side coupling section 4 can also be dispensed with, the leaf spring mount 1 then being connected via the at least one elastomer section 3 directly to the free end section 13 of the first leaf spring 11.

The elastomer section 3 provides, above all, a desired elasticity transversely with respect to the supporting direction A of the leaf spring mount 1 to make it possible that the free end section 13 can pivot somewhat and possibly yield laterally during compression and rebound of the transportation vehicle wheel suspension system 10 with respect to the transportation vehicle body 20.

In contrast, the leaf spring mount 1 is comparatively rigid in the supporting direction A. The rigidity of the leaf spring mount 1 in the supporting direction A is considerably higher than in a transverse direction with respect thereto, with the result that the spring rate of the first leaf spring 11 as far as possible does not experience any impairment.

The body-side coupling section 2 and, if present, also the leaf spring-side coupling section 4 may be manufactured from a material which has a higher rigidity than the material of the elastomer section 3. The coupling section 2 may be produced from an aluminum alloy or from a thermoplastic, other materials also being suitable, however, which make a higher rigidity than the elastomer section 3 which is manufactured from an elastomer possible.

Furthermore, the body-side coupling section 2 and, if present, also the leaf spring-side coupling section 4 can in each case have a common contact face 5 or 6 with the elastomer section 3.

To facilitate mounting, a centering device 9 is provided on the body-side coupling section 2 for the positively locking engagement with a transportation vehicle body-side mating contour 22.

The centering device 9 on the coupling section 2 is configured so as to guide the coupling section 2 of the leaf spring mount 1 transversely with respect to the supporting direction A in the direction toward the setpoint bearing position in the case of deviations from a setpoint bearing position on the transportation vehicle body 20, as can be gathered from FIGS. 3 and 4.

When the leaf spring mount 1 and the transportation vehicle body 20 are brought closer to one another, the mount-side and body-side sections of this centering method or mechanism first of all pass loosely into engagement with one another. During the course of the further joining, the centering device 9 brings about automatic guidance of the leaf spring mount 1 into the setpoint bearing position, to be precise, in particular, even when the position of the leaf spring mount 1 initially differs from the desired setpoint bearing position in the transverse direction with respect to the supporting direction. As a result, it is possible for dimensional deviations during assembly to be compensated for automatically, without additional correction measures being necessary in this regard. Rather, the assembly is self-centering, with the result that it can be automated with high process reliability. This is beneficial with regard to automated axle mounting in series production.

In the assembled state, moreover, the positively locking connection brings about positional fixing of the leaf spring mount 1 in the setpoint bearing position transversely with respect to the supporting direction A.

As can be gathered from FIG. 1, the centering device 9 on the body-side coupling section 2 can be formed by way of a recess 9a which may be of conical configuration. The centering device 9 can thus firstly be configured very simply on the leaf spring mount 1, in particular, its body-side coupling section 2. Secondly, this assists the guidance of the leaf spring mount 1 into the setpoint bearing position on the transportation vehicle body 20.

A corresponding mandrel 23 is configured or attached as a counterpart on the transportation vehicle body 20, with which mandrel 23 the recess 9a comes into engagement. The mandrel 23 can also be configured in such a way that it can selectively also serve for centering of a coil spring. As a result, it is possible for axles with coil springs and axles with leaf springs 1 to be installed selectively on the transportation vehicle with retention of the body-side interface structure.

It is also possible, however, for a projection or mandrel to be provided as centering device 9 on the body-side coupling section 2, which projection or mandrel engages in a positively locking manner into a corresponding recess on the transportation vehicle body 20 to bring about positional fixing transversely with respect to the supporting direction.

If, in its installed position, the leaf spring mount 1 is loaded at all times by way of a pressure force of the spring device in the supporting direction A, additional fastening methods or mechanisms for fixing the leaf spring mount 1 to the transportation vehicle body 20 can be dispensed with. The leaf spring mount 1 is positioned and fixed solely on account of the positively locking engagement of the centering device 9 and on account of the pressure force in the supporting direction A. As a result, the construction of the leaf spring mount 1 remains simple and compact. In addition, a fastening process which would otherwise be required is dispensed with during assembly.

The procedure of the mounting of the above-described transportation vehicle wheel suspension system 10 on the transportation vehicle body 20 is revealed from the combination of FIGS. 2 to 4; in the present case, merely the facets which concern the leaf spring mount 1 and the leaf springs 11 and 12 are to be discussed.

Before the spring device with the leaf springs 11 and 12 is installed on the transportation vehicle body 20, the leaf spring mount 1 is fastened to the end section 13 of the first leaf spring 11. This can take place in any desired way with or without a leaf spring-side coupling section 4.

This preassembled structural unit which is depicted in FIG. 1 is subsequently moved into the region of the transportation vehicle body 20 and is mounted from below on the transportation vehicle body 20.

In this regard, FIG. 2 shows a starting position, in which the leaf springs 11 and 12 are in a relieved state. Neither the first and second mount device 15 and 16 nor the leaf spring mount 1 are connected here. Here, the spring device, in particular, the leaf spring mount 1, is positioned roughly in front of the relevant supporting points.

By way of an upward movement in the direction of the arrow B in FIG. 2, the leaf spring mount 1 is moved closer with its body-side coupling section 2 to the setpoint bearing position on the transportation vehicle body 20. Here, the centering device 9 comes into engagement with its bearing-side and body-side section, in the present case by way of example the recess 9a and the mandrel 23.

In the further course of the approach to the setpoint bearing position, the centering device 9 brings about an automatic orientation of the leaf spring mount 1 with respect to the setpoint bearing position, by deviations transversely with respect to the supporting direction A which can run substantially parallel to the mounting direction B being corrected automatically until the contact of the body-side coupling section 2 against the transportation vehicle body 20 is achieved, as is shown in FIG. 3. Here, the first mount device 15 can additionally be connected on the body side. In FIG. 3, the leaf springs 1 and 2 are nevertheless still relieved.

FIG. 4 shows the transportation vehicle wheel suspension system 10 in the case of a standing transportation vehicle. Here, the free end section 14 of the second leaf spring 12 is now also connected via the second mount device 16 to the wheel support 21. The leaf springs 11 and 12 are in a prestressed state which is deformed with respect to FIGS. 2 and 3 and in which the transportation vehicle body 20 is supported via the transportation vehicle suspension system 10 against the ground. On account of this prestress, the leaf spring mount 1 is pressed in the supporting direction A against the transportation vehicle body 20. Here, the prestress of the leaf springs 11 and 12 is set in such a way that a sufficient pressing force in the supporting direction A is maintained on the leaf spring mount 1 over the entire compression and rebound range of the transportation vehicle wheel suspension system 10.

Here, the leaf spring mount 1 bears merely loosely against the transportation vehicle body 20, that is to say is neither screwed on nor additionally fastened to the transportation vehicle body 20 in some other way in the supporting direction A. The positively locking centering device 9 prevents lateral slipping out of the setpoint bearing position. By way of the leaf spring 11, the leaf spring mount 1 is held pressed against the transportation vehicle body 20 at all times over the entire compression and rebound travel of the transportation vehicle wheel suspension system 10, and is fixed as a result.

The above-described leaf spring mount 1 makes considerably simplified mounting of a transportation vehicle wheel suspension system 10 on a transportation vehicle body 20 possible. As a result, it becomes possible, in particular, for the transportation vehicle wheel suspension system 10 to be mounted on the transportation vehicle body 20 in a fully automated manner, and at the same time for high process reliability to be ensured here. Nevertheless, the complexity in terms of manufacturing and production on the part of the leaf spring mount 1 and the transportation vehicle wheel suspension system 10 remains low. In at least one disclosed embodiment, an interface configuration is possible which allows axles with coil springs and axles with leaf springs 11 to be supported selectively on an identical body-side structure.

The disclosure has been explained in greater detail in the above text on the basis of one exemplary embodiment and further modifications. The exemplary embodiment and the modifications serve to substantiate the practicability of the disclosure. Individual technical features which have been described above in the context of further individual features can also be implemented independently of the latter and in combination with further individual features, even if this is not described expressly, as long as this is technically possible. Therefore, the disclosure is expressly not restricted to the specifically described exemplary embodiment, but rather comprises all refinements defined by the patent claims.

LIST OF DESIGNATIONS

1 Leaf spring mount
2 Body-side coupling section
3 Elastomer section
4 Leaf spring-side coupling section
5 Contact face
6 Contact face
7 Bulge
8 Bulge
9 Centering device
9a Recess
10 Transportation vehicle wheel suspension system
11 Leaf spring (also first leaf spring)
12 Further leaf spring (also second leaf spring)
13 End section
14 End section
15 First mount device
16 Second mount device
20 Transportation vehicle body
21 Wheel support
22 Mating contour
23 Mandrel
A Supporting direction
B Mounting direction

The invention claimed is:

1. A leaf spring mount for support of a leaf spring made of fiber reinforced plastic, the leaf spring mount being configured to support the leaf spring against a transportation vehicle body for a transportation wheel suspension system, the leaf spring mount being configured to be arranged on an end section of the leaf spring to support the leaf spring against the transportation vehicle body, the leaf spring mount comprising:
    a body-side coupling section;
    at least one elastomer section for compensation of movements transversely with respect to a supporting direction; and
    a positively locking centering device provided between the leaf spring mount and the transportation vehicle body, wherein the centering device is provided on the body-side coupling section and is configured on the coupling section to guide the coupling section of the leaf spring mount in response to deviations from a setpoint bearing position on the transportation vehicle body transversely with respect to the supporting direction in the direction toward the setpoint bearing position,
    wherein the leaf spring mount is configured to bear loosely against the transportation vehicle body such that the leaf spring is prestressed to hold the leaf spring mount pressed against the transportation vehicle body at all times over the entire compression and rebound travel of the transportation vehicle wheel suspension system and to fix leaf spring as a result.

2. The leaf spring mount of claim 1, wherein the centering device is configured on the coupling section as a recess.

3. The leaf spring mount of claim 1, wherein the coupling section is vulcanized onto the elastomer section.

4. The leaf spring mount of claim 1, wherein the coupling section consists of a material which has a higher rigidity than the material of the elastomer body.

5. The leaf spring mount of claim 1, wherein the centering device comprises a mandrel and a corresponding recess.

6. The leaf spring mount of claim 5, wherein the mandrel and the corresponding recess are conical.

7. The leaf spring mount of claim 1, wherein the leaf spring mount has a further coupling section for fastening the leaf spring mount to the leaf spring, and the elastomer section connects the two non-connected coupling sections to one another.

8. A transportation vehicle wheel suspension system comprising:
    a leaf spring made from fiber reinforced plastic; and
    a leaf spring mount arranged on an end section of the leaf spring to support the leaf spring against a transportation vehicle body, wherein the leaf spring mount includes a body-side coupling section, and at least one elastomer section for compensation of movements transversely with respect to a supporting direction; and
    a positively locking centering device provided between the leaf spring mount and the transportation vehicle body, wherein the centering device is provided on the coupling section for positive locking engagement with a transportation vehicle body-side mating contour, wherein the centering device is configured on the coupling section to guide the coupling section of the leaf spring mount in response to deviations from a setpoint bearing position on the transportation vehicle body transversely with respect to the supporting direction in the direction toward the setpoint bearing position;
    wherein the leaf spring mount bears loosely against the transportation vehicle body, and
    the leaf spring is prestressed to hold the leaf spring mount pressed against the transportation vehicle body at all times over the entire compression and rebound travel of the transportation vehicle wheel suspension system and to fix leaf spring as a result.

9. The transportation vehicle wheel suspension system of claim 8, further comprising a further leaf spring made from fiber reinforced plastic which forms a V-shaped structure together with the first leaf spring, wherein the V-shaped structure being supported on the transportation vehicle body side in the region of the joined ends of the two leaf springs, and the further leaf spring is supported on the wheel side on its free end section.

10. A method for the mounting of a transportation vehicle wheel suspension system, wherein a leaf spring, provided with a leaf spring mount, is mounted from below on the transportation vehicle body by the leaf spring being connected, the method comprising:
    moving the leaf spring mount, in a relieved state, by way of its end section which lies opposite the leaf spring mount, into contact against the transportation vehicle body;
    guiding the leaf spring mount using a centering device, during mounting, into a setpoint bearing position on the transportation vehicle body; and
    subsequently stressing the leaf spring, as a result of which the leaf spring mount is held in the setpoint bearing position solely by way of a centering action provided by the centering device's supporting force.

11. The method of claim 10, wherein the centering device on the coupling section guides the coupling section of the leaf spring mount in response to deviations from a setpoint bearing position on the transportation vehicle body transversely with respect to the supporting direction in the direction toward the setpoint bearing position.

12. The method claim 10, wherein the centering device is configured on the coupling section as a recess.

13. The method of claim 10, wherein the centering device comprises a mandrel and a corresponding recess.

14. The method of claim 13, wherein the mandrel and the corresponding recess are conical.

15. The method of claim 10, wherein the leaf spring mount has a further coupling section for fastening the leaf spring mount to the leaf spring, and the elastomer section connects the two non-connected coupling sections to one another.

\* \* \* \* \*